US009223938B2

(12) United States Patent
McGuire

(10) Patent No.: US 9,223,938 B2
(45) Date of Patent: Dec. 29, 2015

(54) LOCATION BOUND SECURE DOMAINS

(75) Inventor: James B. McGuire, Delray Beach, FL (US)

(73) Assignee: Google Technology Holdings LLC, Mountain View, CA (US)

( * ) Notice: Subject to any disclaimer, the term of this patent is extended or adjusted under 35 U.S.C. 154(b) by 1363 days.

(21) Appl. No.: 11/967,592

(22) Filed: Dec. 31, 2007

(65) Prior Publication Data

US 2009/0172794 A1    Jul. 2, 2009

(51) Int. Cl.
*H04L 29/06* (2006.01)
*G06F 21/10* (2013.01)

(52) U.S. Cl.
CPC ........ *G06F 21/10* (2013.01); *G06F 2221/0708* (2013.01)

(58) Field of Classification Search
CPC .......................... G06F 21/10; G06F 2221/0708
USPC ...................................... 726/27, 15
See application file for complete search history.

(56) References Cited

U.S. PATENT DOCUMENTS

| 8,489,868 | B2 * | 7/2013 | Yach ..................... G06F 21/121 711/100 |
| 2003/0228866 | A1 * | 12/2003 | Pezeshki .................... 455/422.1 |
| 2004/0025022 | A1 * | 2/2004 | Yach et al. ..................... 713/176 |
| 2005/0086661 | A1 * | 4/2005 | Monnie et al. ................. 719/310 |
| 2006/0082801 | A1 * | 4/2006 | Ohishi ......................... 358/1.13 |
| 2006/0105758 | A1 | 5/2006 | Maislos |
| 2006/0236258 | A1 * | 10/2006 | Othmer et al. ................ 715/774 |
| 2008/0100610 | A1 * | 5/2008 | Murakami et al. ........... 345/418 |
| 2008/0140160 | A1 * | 6/2008 | Goetz et al. ..................... 607/60 |
| 2008/0222707 | A1 * | 9/2008 | Pathuri et al. ..................... 726/4 |

OTHER PUBLICATIONS

Nokia; Tutorial on Signed MIDlets; Forum Nokia; Version 1.1; Jul. 15, 2005.
Otto Kolsi & Teemupekka Virtanen; "MIDP 2.0 Security Enhancements"; Helsinki University of Technology, Telecommunications Software and Multimedia Laboratory; 0-7695-2056; Jan. 2004; IEEE.

* cited by examiner

*Primary Examiner* — Mohammad L Rahman
(74) *Attorney, Agent, or Firm* — Shumaker & Sieffert, P.A.

(57) ABSTRACT

A method, apparatus, and electronic device with secure operation based on geography are disclosed. A positioning mechanism 404 may determine a geographic location of the apparatus or electronic device. A processor 104 may identify a secure domain for a virtual machine application. The processor 104 may determine an availability of an application programming interface for the virtual machine application based on the geographic location.

14 Claims, 6 Drawing Sheets

400

LOCATION BOUND SECURE DOMAINS

FIELD OF THE INVENTION

The present invention relates to a method and system for secure operation of a virtual machine application on a mobile device. The present invention further relates to controlling access by the virtual machine application to application programming interfaces.

INTRODUCTION

Java® Platform, Micro Edition (ME) is a subset of the Java specification directed towards resource-constrained environments, such as mobile computing devices, mobile telephones, handheld computers, and similar portable devices. One specification for the Java ME® is a mobile information device profile (MIDP). A virtual machine under the MIDP for mobile computing devices, referred to as a MIDlet, may be downloaded onto a mobile computing device. Including a signed electronic certificate may increase the security of executing these MIDlets.

SUMMARY OF THE INVENTION

A method, apparatus, and electronic device with secure operation based on geography are disclosed. A positioning mechanism may determine a geographic location. A processor may identify a secure domain for a virtual machine application. The processor may determine an availability of an application programming interface for the virtual machine application based on the geographic location.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, apparatus, and electronic device with secure operation based on geography are disclosed. A positioning mechanism may determine a geographic location for the apparatus or electronic device. A processor may identify a secure domain for a virtual machine application. The processor may determine an availability of an application programming interface for the virtual machine application based on the geographic location.

Figure 1:
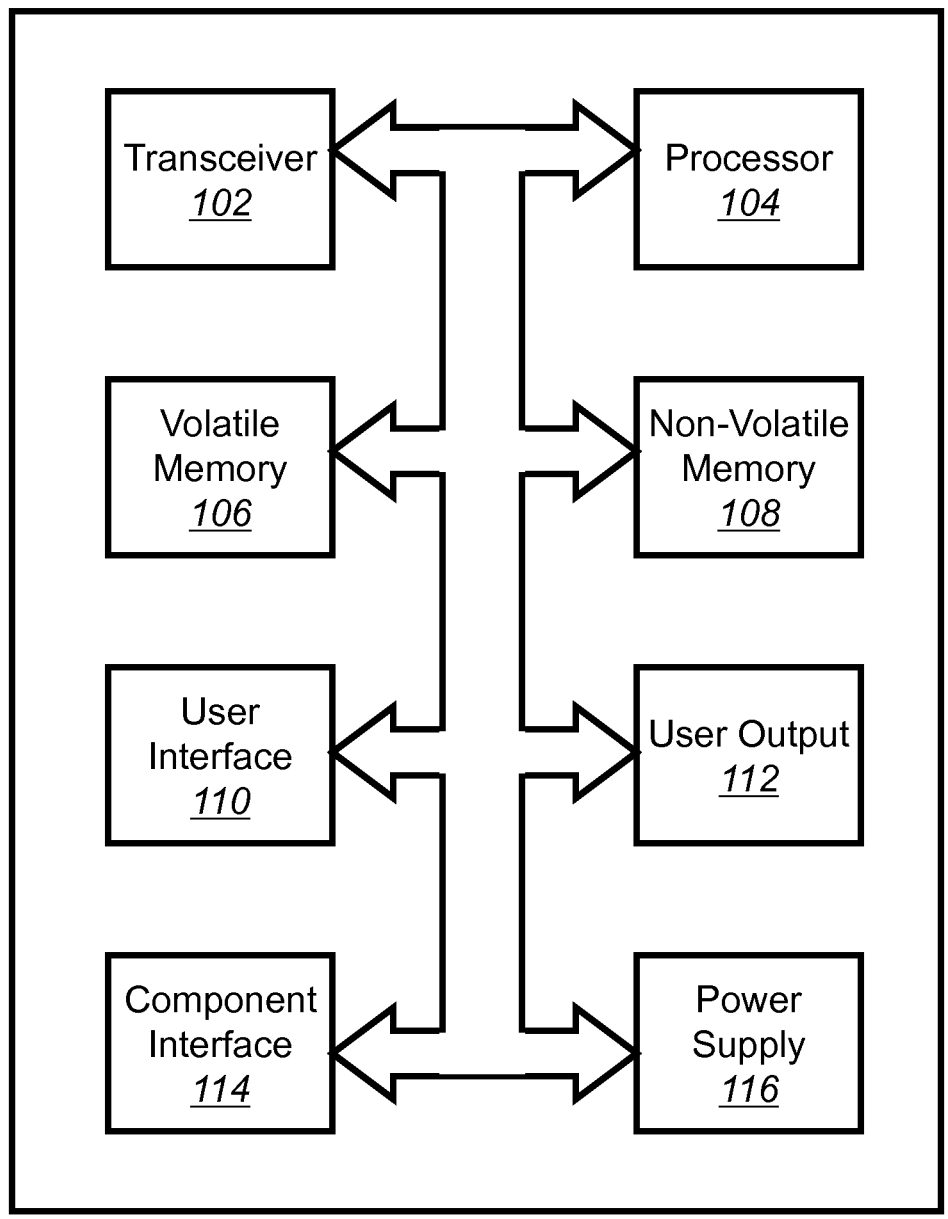
FIG. 1 illustrates in a block diagram one embodiment of a handheld device that may be used to implement the communication protocol management method.

FIG. 1 illustrates in a block diagram one embodiment of a handheld device 100 that may be used to execute a virtual machine application. The handheld device 100 may access the information or data stored in a network. The handheld device 100 may support one or more applications for performing various communications with the network. The handheld device 100 may implement any operating system, such as Windows or UNIX, for example. Client and server software may be written in any programming language, such as C, C++, Java or Visual Basic, for example. The handheld device 100 may be a mobile phone, a laptop, a personal digital assistant (PDA), or other portable device. For some embodiments of the present invention, the handheld device 100 may be a WiFi® capable device, which may be used to access the network for data or by voice using voice over internet protocol (VOIP). The handheld device 100 may include a transceiver 102 to send and receive data over the network.

The handheld device 100 may include a controller or processor 104 that executes stored programs. The controller or processor 104 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The handheld device 100 may also include a volatile memory 106 and a nonvolatile memory 108 to be used by the processor 104. The volatile 106 and nonvolatile data memory storage 108 may include one or more electrical, magnetic or optical memories such as a random access memory (RAM), cache, hard drive, or other memory device. The memory may have a cache to speed access to specific data. The memory may also be connected to a compact disc-read only memory (CD-ROM), digital video disc-read only memory DVD-ROM), DVD read write input, tape drive or other removable memory device that allows media content to be directly uploaded into the system.

The handheld device 100 may include a user input interface 110 that may comprise elements such as a keypad, display, touch screen, or any other device that accepts input. The handheld device 100 may also include a user output device that may comprise a display screen and an audio interface 112 that may comprise elements such as a microphone, earphone, and speaker. The handheld device 100 also may include a component interface 114 to which additional elements may be attached, for example, a universal serial bus (USB) interface or an audio-video capture mechanism. Finally, the handheld device 100 may include a power supply 116.

Client software and databases may be accessed by the controller or processor 104 from the memory, and may include, for example, database applications, word processing applications, video processing applications as well as components that embody the decision support functionality of the present invention. The user access data may be stored in either a database accessible through a database interface or in the memory. The handheld device 100 may implement any operating system, such as Windows or UNIX, for example. Client and server software may be written in any programming language, such as ABAP, C, C++, Java or Visual Basic, for example.

A mobile computing device (MCD) 100 may download a virtual machine application to be executed on the MCD 100. The MCD 100 may be running a Java® Micro Edition (ME) with a mobile information device profile (MIDP) specification, allowing it to use mobile information device (MID) virtual machine applications called MIDlets. By using electronically signed certificates with the MIDlets, the MCD 100 may be assured of a higher level of security on the machine. Unsigned MIDlets may be used, but may be granted a lower level of access to various functions of the MCD 100.

The security of the MIDlet may be further increased by limiting the availability of a native function of the MCD 100 to the MIDlet, such as an application programming interface (API). A MCD 100 may improve security while using a MIDlet by employing a secure domain, a set of permissions regarding various functions or APIs that may be assigned to a MIDlet. The secure domains may have an allowed permission, granting unfettered access to an API; user permission, granting access upon user approval; or denial, barring the MIDlet from using that API. The user permissions may be set at various level of interaction modes, such as blanket, wherein the MIDlet has access to that API for the length of installation; session, wherein the MIDlet has access to that API for as long as the MIDlet is running; or one shot, wherein the MIDlet must ask permission for each use of the API.

Figure 2:
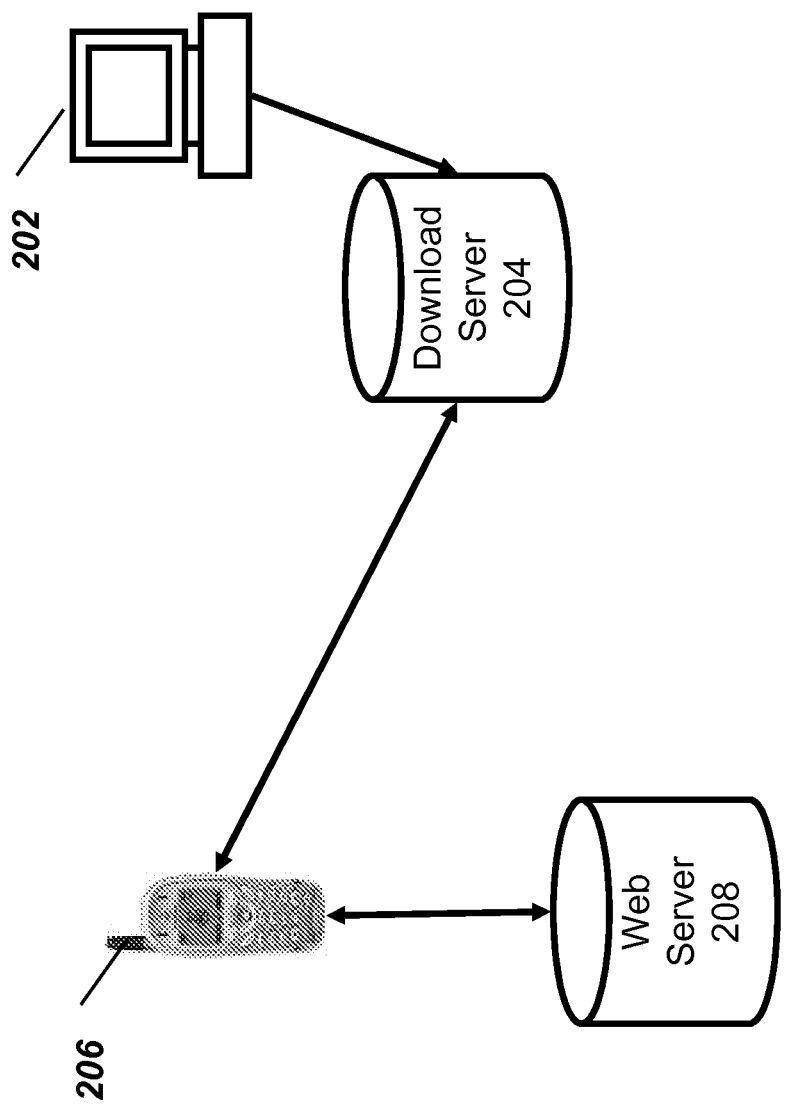
FIG. 2 illustrates in a block diagram one embodiment of a system for downloading a virtual machine application to a mobile computing device.

FIG. 2 illustrates in a block diagram one embodiment of a system 200 for downloading a virtual machine application to a mobile computing device. A developer 202 may create a virtual machine application, or MIDlet, and attach a signed electronic certificate. The developer 202 may transfer the virtual machine application to a download center 204. A user 206 may request a download of the virtual machine application from the download center 204. The download center 204 may download the virtual machine application to a handheld device 100 of the user 206. The user may then send an installation status report to the download center 204. The user 206 may then verify the signature of the certificate and install the virtual machine application on the handheld device 100. The user 206 may then use the virtual machine application, possibly in interaction with a web server 208.

Figure 3:
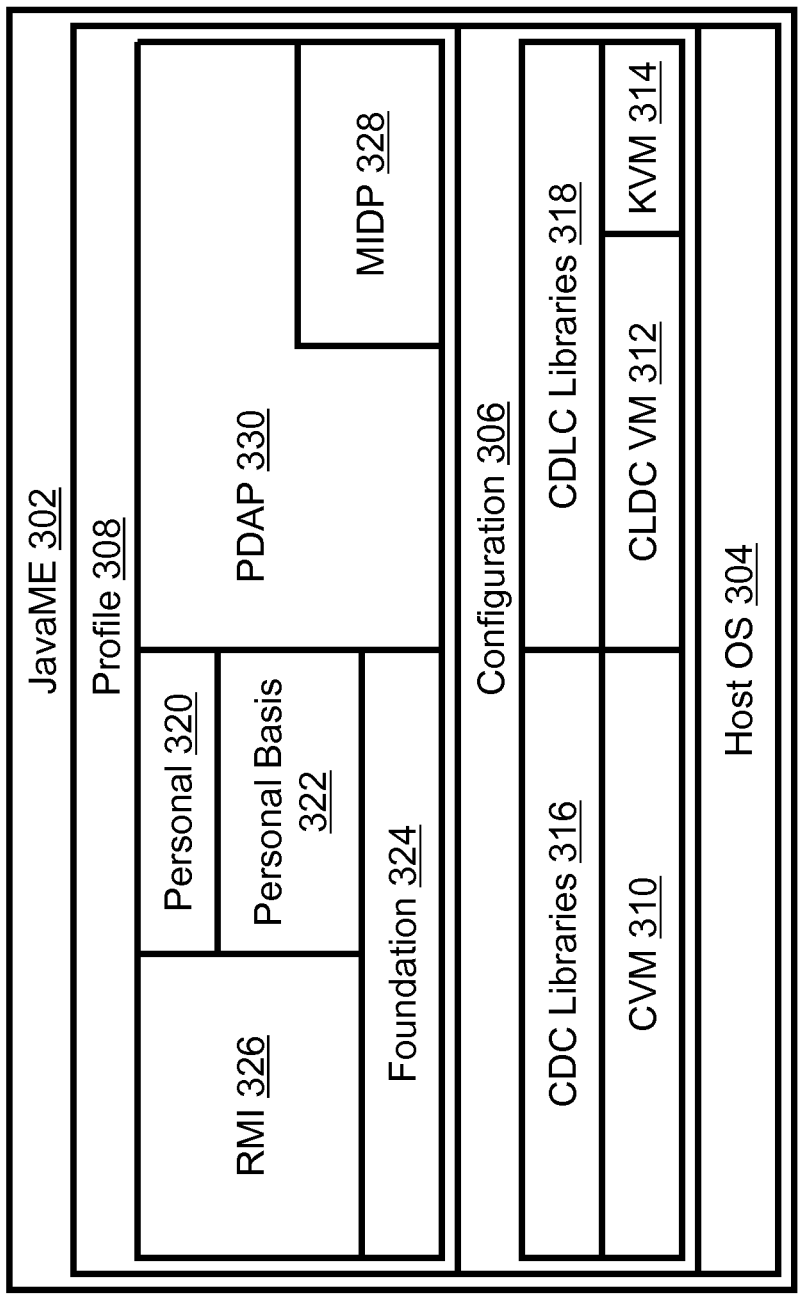
FIG. 3 illustrates in a block diagram one embodiment of a software configuration of a mobile computing device.

FIG. 3 illustrates in a block diagram one embodiment of a software configuration 300 of a MCD 100, such Java ME® 302. A MCD 100 may run a host operating system 302 as a basis for implementing all other software applications. The host operating system 302 may be used in conjunction with a configuration 304 and profile 306 to run the various virtual machine applications. The configuration 304 may include a coherent virtual machine (CVM) 310, a connected limited device configuration (CLDC) virtual machine (VM) 312, and a kilobyte virtual machine (KVM) 314. A connected device configuration (CDC) library 316 may support a CVM 310, while a CLDC library 318 may support the CLDC VM 312 and the KVM 314. The profile 308 may include personal profile 320 and a personal basis profile 322. The personal basis profile 322 may be a subset of the personal profile 320. Both the personal profile 320 and the personal basis profile 322 may be based on a foundation profile 324. The profile 308 may include a remote method invocation profile 326. The profile 308 may further include a MIDP 328 with access to a portable data acquisition package (PDAP) 330.

The use of such a configuration may create a greater flexibility with which to use a MCD 100. Secure domains may be used to control the access that MIDlets downloaded onto MCD 100 may have to various APIs. These secure domains may be expanded to take into account environmental factors. One such factor that may be used to adjust a secure domain on a continuing basis is location. Other environmental factors that may be used to determine the scope of a secure domain include communication signal strength, communication signal encryption strength, device temperature, power level, or other environmental factors that may have an effect on the security or stability of the device as the MIDlet uses the API.

Figure 4:
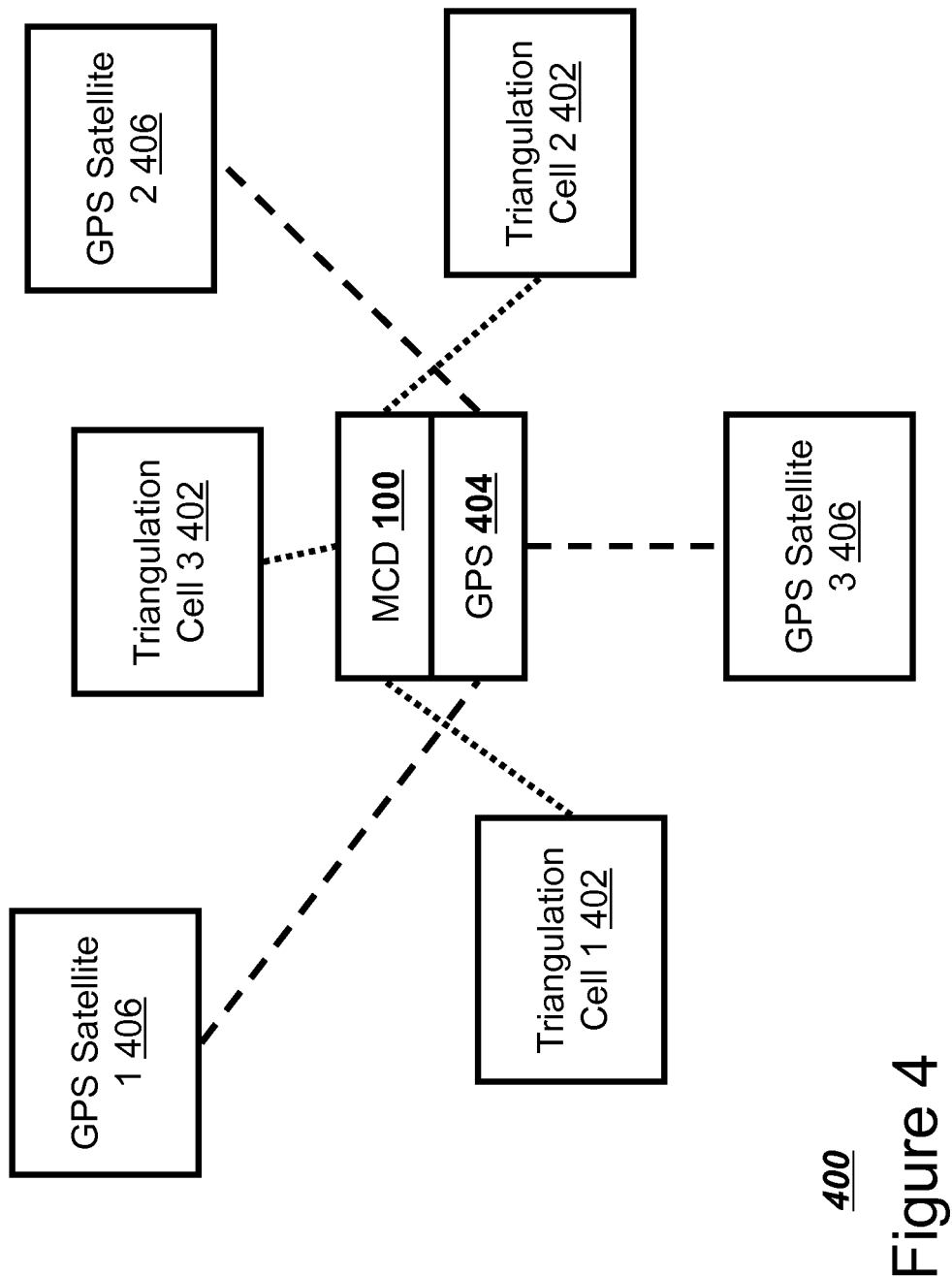
FIG. 4 illustrates in a block diagram one embodiment of a system for locating a mobile computing device.

A sensor may be used to determine if the correct environmental factor is present for the MIDlet to be present in the secure domain, using a specified API. For example, a positioning mechanism may be integrated into a MCD 100, particularly through the component interface 114. FIG. 4 illustrates in a block diagram one embodiment of a system 400 for locating a MCD 100. An MCD 100 that is in regular contact with telecommunication cells 402 may use those cells to triangulate a position for the MCD 100. Additionally, a global positioning system (GPS) locator device 404 connected to the component interface 114 of the MCD 100 may connect with GPS satellites 406 to determine a position of the MCD 100.

Figure 5:
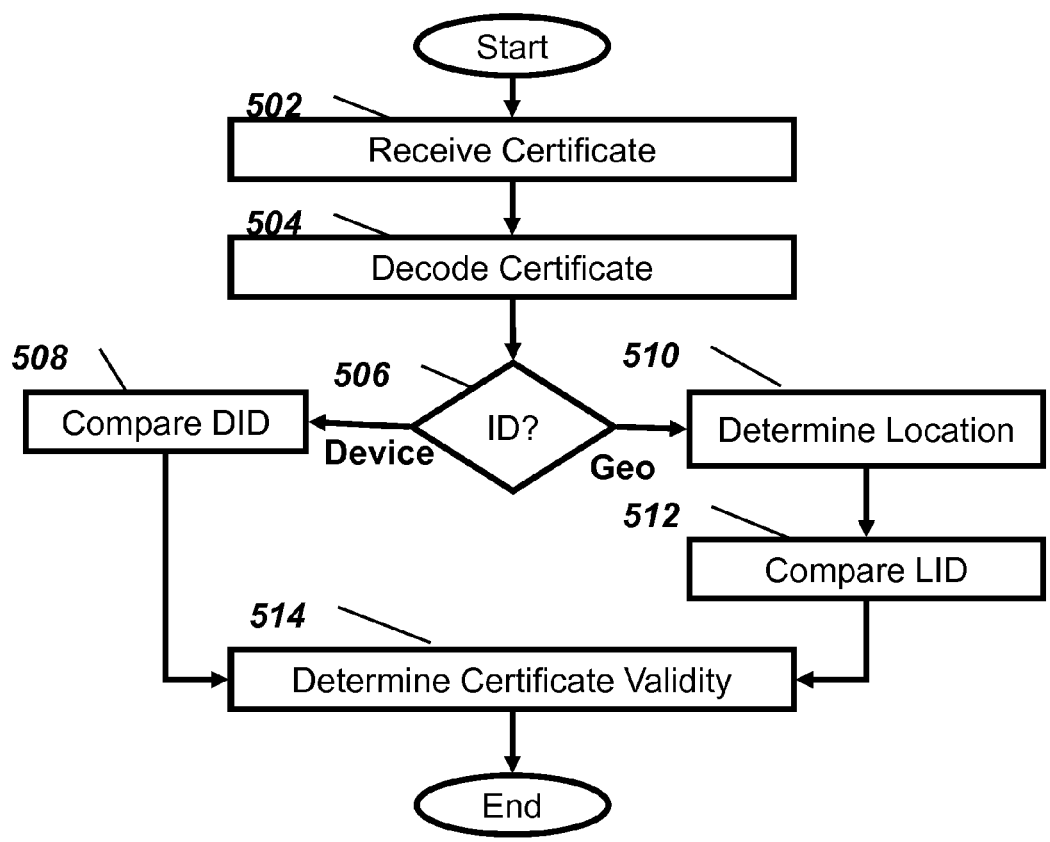
FIG. 5 illustrates in a flowchart one embodiment of a method for certifying a virtual machine application for a mobile computing device based on location.

FIG. 5 illustrates in a flowchart one embodiment of a method 500 for certifying a virtual machine application for a mobile computing device based on location. A MCD 100 may receive a certificate associated with a VM application (VMA), or MIDlet, upon the downloading of the VMA (Block 502). The MCD 100 may decode the certificate (Block 504). The certificate may include an identifier (ID). The ID may be device specific to bind the VMA to a specific device, or location specific to bind use of the VMA to specific location. If the ID is a device specific ID (Block 506), the MCD 100 may compare the device ID (DID) to the ID of the MCD 100 (Block 508). If the ID is a location specific ID (Block 506), the MCD 100 may determine the location of the MCD 100 (Block 510). The MCD 100 may compare the location ID (LID) to the location of the MCD 100 (Block 512). The MCD 100 may use these comparisons to determine the validity of the certificate for that device (Block 514).

Figure 6:
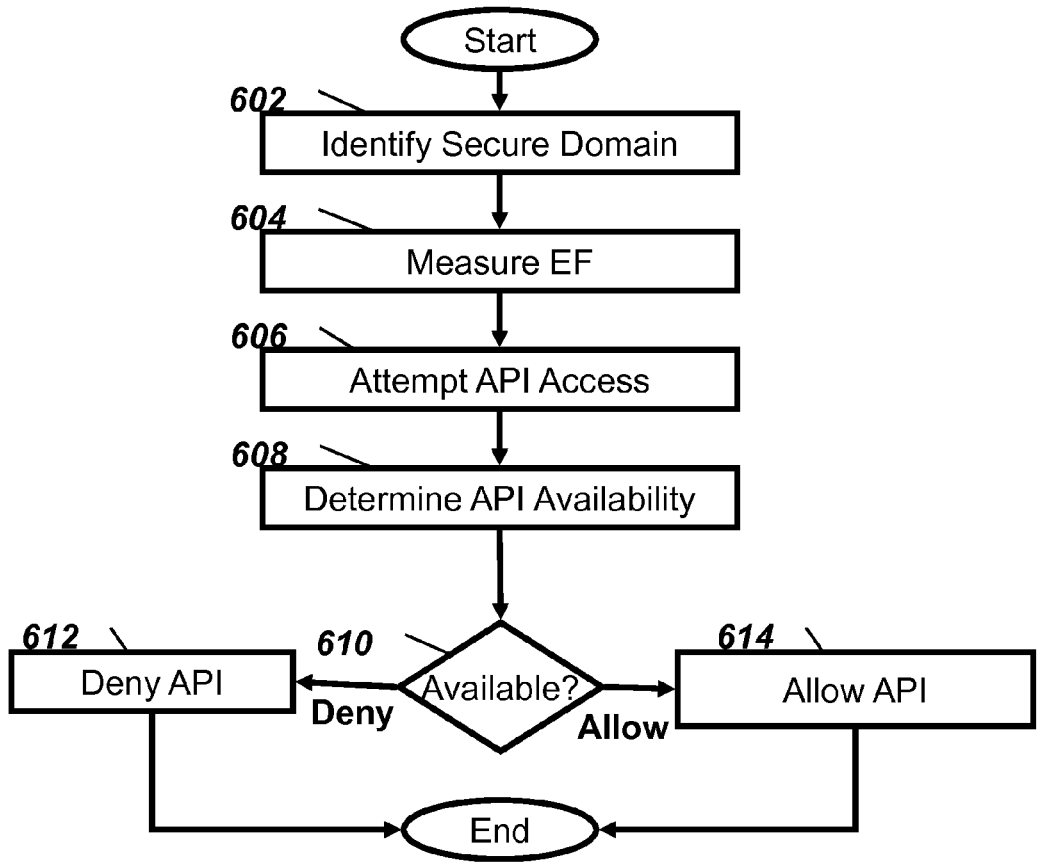
FIG. 6 illustrates in a flowchart one embodiment of a method for controlling access to an application programming interface based on location.

FIG. 6 illustrates in a flowchart one embodiment of a method 600 for controlling access to an application programming interface based on location. Upon receiving the certificate associated with the VMA, the MCD 100 may identify the secure domain for that VMA (Block 602). The secure domain being contingent upon an environmental factor of the MCD 100, the MCD 100 may measure the environmental factor (EF), such as the location, of the MCD 100 (Block 604). The VMA running on the MCD 100 may seek to access an API or other function (Block 606). The MCD 100 may determine the availability of the API based upon the measurement of an environmental factor of the device (Block 608). An API may be removed from a secure domain if a specified environmental factor, such as correct geographic location, is present or added to a secure domain in others. If the API is not available (Block 610), the MCD 100 may deny the VMA the use of that API (Block 612). If the API is available (Block 610), the MCD 100 may allow the VMA the use of that API (Block 614).

Embodiments may also be practiced in distributed computing environments where tasks are performed by local and remote processing devices that are linked (either by hardwired links, wireless links, or by a combination thereof through a communications network.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

I claim:

1. A method comprising:
   identifying, by a mobile computing device, a secure domain for a virtual machine application stored by the mobile computing device, wherein the secure domain includes a set of permissions for controlling access to a plurality of application programming interfaces of an operating system of the mobile computing device, wherein the set of permissions includes one or more of a blanket interaction mode, session interaction mode, or a one-shot interaction mode, wherein the blanket interaction mode manages access to an application programming interface of the plurality of application programming interfaces for a duration of an installation of the virtual machine application, wherein the session interaction mode manages access to the application programming interface for as long as the virtual machine application is running, and wherein the one-shot interaction mode requires the virtual machine application to request permission for each use of the application programming interface;
   responsive to determining, by the mobile computing device, based on the secure domain, that the virtual machine application is permitted to access at least one application programming interface from the plurality of application programming interfaces of the operating system, allowing access to the at least one application programming interface; and
   responsive to determining, by the mobile computing device, based on the secure domain, that the virtual machine application is not permitted to access at least one other application programming interface from the plurality of application programming interfaces of the operating system, denying access to the at least one other application programming interface.

2. The method of claim 1, further comprising:
   receiving, by the mobile computing device, a certificate associated with the virtual machine application; and
   determining, by the mobile computing device and based on the certificate, the secure domain.

3. The method of claim 2, further comprising:
   determining, by the mobile computing device, based on a comparison of a device identifier associated with the certificate and an identifier of the mobile computing device, whether the certificate is valid.

4. The method of claim 2, further comprising:
   determining, by the mobile computing device, based on a comparison of a location specific identifier associated with the certificate and a current geographic location of the mobile computing device, whether the certificate is valid.

5. The method of claim 4, wherein the current geographic location is determined using at least one of a global positioning system locator or telecommunication cell triangulation.

6. A mobile computing device comprising:
   a transceiver that receives a certificate associated with the virtual machine application, wherein the certificate includes a device specific identifier;
   a memory that stores a virtual machine application and an operating system; and
   a processor that:
     identifies a secure domain for the virtual machine application, wherein the secure domain includes a set of permissions for controlling access, by the virtual machine application, to a plurality of application programming interfaces of the operating system, responsive to determining, based on the secure domain and a comparison of a device specific identifier of the electronic device and the device specific identifier of the certificate, that the virtual machine application is permitted to access at least one application programming interface from the plurality of application programming interfaces of the operating system allows access to the at least one application programming interface, and responsive to determining, based on the secure domain and a comparison of a device specific identifier of the electronic device and the device specific identifier of the certificate, that the virtual machine application is not permitted to access at least one other application programming interface from the plurality of application programming interfaces of the operating system, denies access to the at least one other application programming interface.

7. The mobile computing device of claim 6, wherein the processor determines, based on a comparison of a device identifier associated with the certificate and an identifier of the mobile computing device, whether the certificate is valid.

8. The mobile computing device of claim 6, wherein the processor determines, based on a comparison of a location specific identifier associated with the certificate and a current geographic location of the mobile computing device, whether the certificate is valid.

9. The mobile computing device of claim 8, further comprising:
   a global positioning system locator that determines the current geographic location of the mobile computing device.

10. An electronic device comprising:
   a sensor that detects an environmental factor, wherein the environmental factor includes one or more of a signal strength, a communication signal encryption strength, a device temperature, or a power level;
   a memory that stores a virtual machine application and an operating system; and
   a processor that identifies a secure domain for the virtual machine application, wherein the secure domain includes a set of permissions for controlling access, by the virtual machine application, to a plurality of application programming interfaces of the operating system, responsive to determining, based on the environmental factor and the secure domain, that the virtual machine application is permitted to access at least one application programming interface from the plurality of application programming interfaces of the operating system, allows access to the at least one application programming interface, and, responsive to determining, based on the environmental factor and the secure domain, that the virtual machine application is not permitted to access at least one other application programming interface from the plurality of application programming interfaces of the operating system, denies access to the at least one other application programming interface.

11. The electronic device of claim 10, wherein the processor allows access to the at least one application programming interface within a geographic region.

12. The electronic device of claim 10, wherein the processor denies access to the at least one other application programming interface within a geographic region.

13. The electronic device of claim 10, further comprising a transceiver that receives a certificate associated with the virtual machine application, the certificate being a basis for the secure domain.

14. The electronic device of claim 13, wherein the processor determines, based on a comparison of a location specific identifier associated with the certificate and a geographic location of the mobile computing device, whether the certificate is valid.

* * * * *